United States Patent
Longo

(10) Patent No.: US 8,412,847 B2
(45) Date of Patent: Apr. 2, 2013

(54) MAPPING NETWORK ADDRESSES TO ORGANIZATIONS

(75) Inventor: Martin D. Longo, Petaluma, CA (US)

(73) Assignee: Demandbase, Inc., San Francisco, CA (US)

( * ) Notice: Subject to any disclaimer, the term of this patent is extended or adjusted under 35 U.S.C. 154(b) by 0 days.

(21) Appl. No.: 12/916,448

(22) Filed: Oct. 29, 2010

(65) Prior Publication Data

US 2011/0106920 A1      May 5, 2011

Related U.S. Application Data

(60) Provisional application No. 61/257,399, filed on Nov. 2, 2009.

(51) Int. Cl.
*G06F 15/177* (2006.01)

(52) U.S. Cl. .......... 709/245; 709/220; 709/224; 707/770

(58) Field of Classification Search .............. 705/10; 709/206, 245, 220, 224; 726/22; 707/3, 707/6; 770/770
See application file for complete search history.

(56) References Cited

U.S. PATENT DOCUMENTS

| | | | |
|---|---|---|---|
| 6,813,645 | B1 | 11/2004 | Meyer |
| 7,620,655 | B2 | 11/2009 | Larsson et al. |
| 2002/0040394 | A1 | 4/2002 | Shapira |
| 2004/0122939 | A1 | 6/2004 | Perkins |
| 2005/0240617 | A1 | 10/2005 | Lund et al. |
| 2006/0059238 | A1* | 3/2006 | Slater et al. .................. 709/206 |
| 2007/0268877 | A1 | 11/2007 | Buckley et al. |
| 2007/0271244 | A1* | 11/2007 | Lin .................. 707/3 |
| 2007/0288579 | A1* | 12/2007 | Schunemann ............... 709/206 |
| 2008/0028029 | A1* | 1/2008 | Hart ............... 709/206 |
| 2009/0119268 | A1* | 5/2009 | Bandaru et al. ................... 707/3 |
| 2009/0234853 | A1* | 9/2009 | Gupta et al. ..................... 707/6 |
| 2010/0064013 | A1* | 3/2010 | Aranzulla ..................... 709/206 |
| 2010/0088765 | A1* | 4/2010 | Lund et al. ...................... 726/22 |
| 2010/0191577 | A1* | 7/2010 | Lu et al. ......................... 705/10 |
| 2010/0312837 | A1* | 12/2010 | Bodapati et al. ............. 709/206 |

OTHER PUBLICATIONS

PCT International Search Report, PCT Application No. PCT/US10/55121, Jan. 10, 2011, 10 pages.

* cited by examiner

*Primary Examiner* — Jungwon Chang

(74) *Attorney, Agent, or Firm* — Fenwick & West LLC

(57) ABSTRACT

Network addresses (e.g., IP addresses) are considered candidates for association with organizational entities (organizations or various subgroups thereof), based on some evidence of a relationship between them. The candidate addresses are scored based on one or more factors that indicate a probability that the candidate address actually belongs to the organizational entity. The candidate addresses with sufficient scores are stored as actual associations between the candidate address and the organizational entity.

20 Claims, 2 Drawing Sheets

US 8,412,847 B2

MAPPING NETWORK ADDRESSES TO ORGANIZATIONS

CROSS REFERENCE TO RELATED APPLICATIONS

The application claims the benefit of Provisional Application No. 61/257,399, filed on Nov. 2, 2009, which is hereby incorporated herein by reference.

BACKGROUND

1. Field of Art

The disclosed embodiments relate generally to electronic data management, and more specifically to techniques for identifying an organizational entity (e.g., an organization or its various subgroups) based on a network address (e.g., an IP address).

2. Background of the Invention

Correlating a given network address such as an internet protocol (IP) address with the identity of the real-world organization to which it belongs, or to one or more subgroups of the organization—a technique known as "reverse lookup"—has a number of valuable uses. For example, in a business-to-business (B2B) environment, it is useful for a website operator to know the identity of organizations viewing its website, which in turn can lead to callbacks by sales staff and ultimately to purchases.

Existing methodologies for determining organizational entities (organizations or their subgroups) associated with network addresses are frequently ineffective. For example, registries like the American Registry for Internet Numbers (ARIN) and Réseaux IP Européens (RIPE) track IP address-related information, such as the organization owning a given block of IP addresses. However, these registries do not always accurately reflect the true identity of the organization using a given IP address. For example, although a registry typically lists the name of an Internet service provider (ISP) owning a large block of addresses, it would likely not additionally specify the identity of a small business to which the ISP in turn sub-leased a small block of fixed IP addresses within the ISP's larger block unless the small business had specifically requested its inclusion within the registry. Additionally, changes in organizational identity or structure, e.g. those triggered by business mergers and acquisitions, are often not reflected in the registry, leading to misleading results when performing registry lookups.

SUMMARY

Network addresses (e.g., IP addresses) are considered candidates for association with organizational entities (organizations or various subgroups thereof), based on some evidence of a relationship between them. The candidate addresses are scored based on one or more factors that indicate a probability that the candidate address actually belongs to the organizational entity. The candidate addresses with sufficient scores are stored as actual associations between each candidate address and the organizational entity.

A relationship between an address and an organization may be evidenced in various ways. For example, a user might explicitly provide some indication of an organization with which he or she is affiliated, such as entering a value in a "Company name" field on a web-based form, and the entered value can then be tentatively associated with an IP address from which the form is being accessed. As another example, email records can be examined, such as records storing both an IP address of a user who opened an email and company information of the intended recipient. The IP address can then be considered a candidate for association with the organization based on this evidence.

The candidate address can be scored based on all or a subset of many factors, each of which can act as one component of an aggregate score. In one embodiment, the factors include the degree to which the address/organization relationship occurred during expected hours of operation of the organization (e.g., business hours), the matching of area codes associated with the candidate address and the organization, the independence of the candidate address from other organizations, and the inclusion of the candidate address within a range already associated with the organization.

In one embodiment, once the addresses are associated with the organizations they can then be used to provide meaningful identification of users of those addresses. For example, a web server could customize a web page for visitor to a web site based on an organization with which the visitor's IP address is associated, or a company could log names of the organizations that have viewed its web site.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF DRAWINGS

Figure 1:
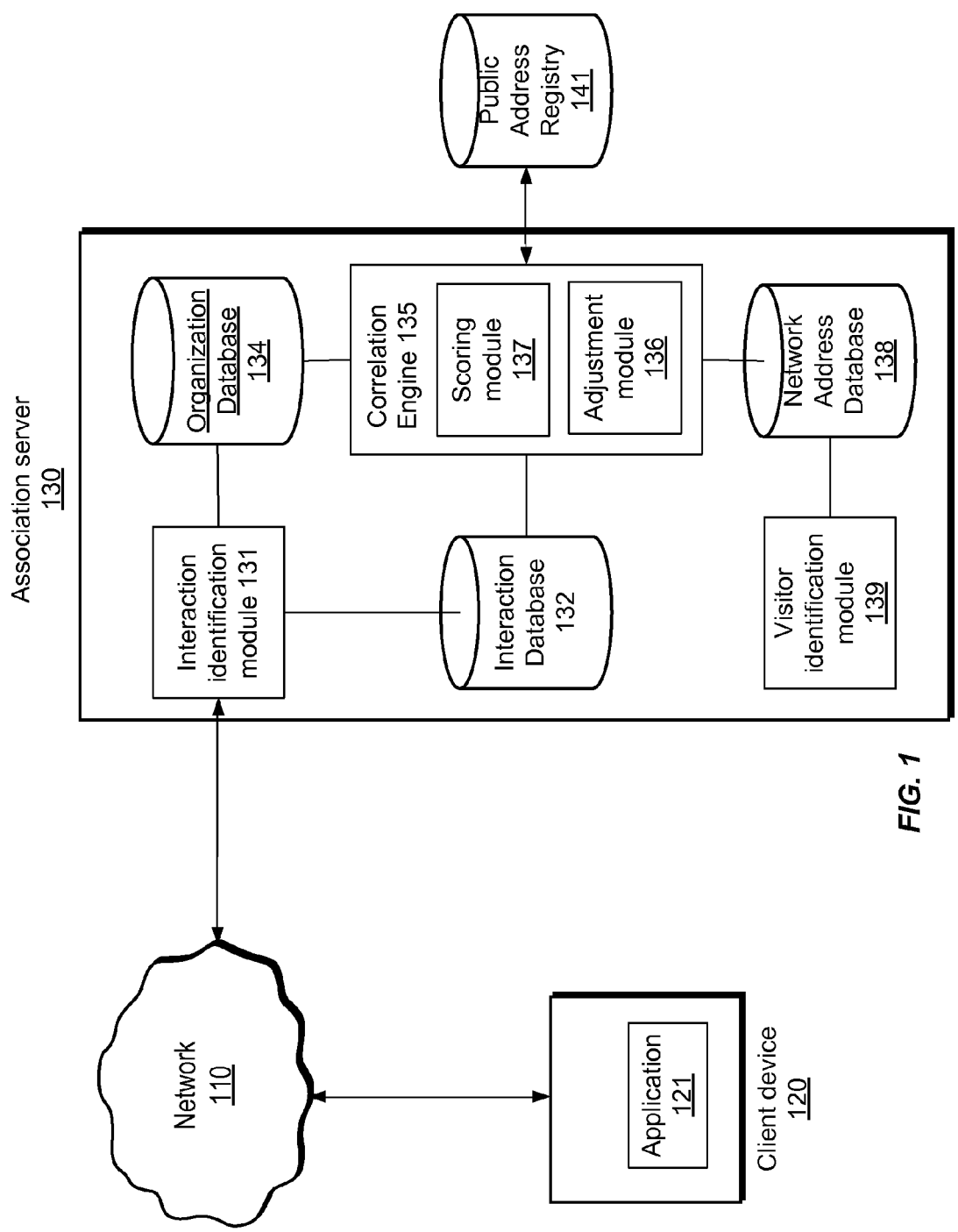
FIG. 1 is a block diagram of a system architecture, according to one embodiment.

FIG. 1 is a block diagram of a system architecture, according to one embodiment. An association server 130 receives and processes interaction information from which IP addresses or other network addresses can be identified as candidates for association with organizational entities.

Association server 130 includes an interaction database 132 that stores the received interaction information, a correlation engine 135 that processes the interaction information and identifies which addresses genuine belong to which organizational entities, and a network address database 138 that stores the address/organization associations identified by the correlation engine 135. In one embodiment, the correlation engine 135 identifies the genuine address/organization associations by using an organization database 134 storing information about organizations and/or a public address registry 141 storing information about the addresses. In one embodiment, the association server 130 further comprises a visitor identification module 139 that uses the network address database 138 to identify the organization associated with a given address (e.g., the address of a visitor to a website of, or analyzed by, the association server 130).

In some embodiments, the interaction information is recorded based on use of a client device 120, such as the use of a web browser or other application 121 to enter information related to the user's organization, to open emails addressed to a user of an organization, and the like. The client device 120 is a device such as a personal computer, digital assistant, personal digital assistant, cellular phone, mobile phone, smart phone or laptop computer, or more generally any device connected to the network 110 and capable of receiving the probe message and requesting the resource identified in the message. The client device 120 typically can retrieve e-mail, e.g., by using an installed e-mail application or communicating with a web-based service.

The public address registry 141, such as ARIN or RIPE, stores associations of registered entities, such as Internet service providers (ISPs) or individual businesses, with a block or blocks of IP addresses with which they are associated.

The organization database 134 stores information on various organizational entities. Such information may be grouped by organization unit, such an individual offices and/or departments. In one embodiment, the information includes a name of the organization entity (e.g., the entire organization, or sub-units thereof), and any associated information, such as mailing address, area code, time zone, and a list of IP addresses expected to be associated with the organization entity (e.g., as listed in the public address registry).

The interaction identification module 131 may use different techniques, or different combinations of techniques, in different embodiments to identify the possible relationships between addresses and organizations. In one embodiment the interaction identification module 131 receives explicit user input from a client 120. For example, the user may use the application 121 (a web browser, in this example) to view a web page form for which the association server 130, or a system affiliated with the association server, provides all or part of the functionality, including an organization selection control used to obtain organization information. For example, the organization selection control may auto-complete organization names entered on the form, and when the form is submitted, also provide the organization name and the IP address through which the page is accessed, back to the interaction module 131. As another related example, the association server 130 might embed a welcome control on a web page, the welcome control inferring an organization name associated with the visitor identification module 139 (described later) based on the IP address through which the user accesses the page and providing organization-specific information on the page, along with the ability to specify a different organization. If the user specifies that he or she belongs to a different organization than the one initially suggested, the welcome control sends the IP address and the specified organization name to the interaction identification module 131.

The interaction identification module 131 may additionally and/or alternatively examine prior actions with respect to electronic mail. For example, in one embodiment the entity managing the association server contracts with an Internet service provider (ISP) or other similar organization to obtain bulk email records specifying events such as the opening of emails. Such bulk data might include the email's destination address (from which the organization name could be derived using the organization database 134) and the IP address through which the email was opened.

As an alternative or addition to obtaining bulk email data from another source, the interaction module 131, or another component of the association server 130, may actively send emails and identify an IP address from which the emails are viewed. For example, the interaction module 131 (or other component) may send messages to a set of known email addresses associated with an organizational entity, including within each message some link to content provided by the association server 130 or an affiliated server to which the association server 130 has access, such as an image. The link to the external content could be a uniform resource locator (URL) that embeds an organizational entity identifier, such as the domain of the email address to which the email was sent, e.g., xyzcorp.com. Then, when the user opens the email message via the application 121 (an email application, in this example), the application will request the external content from the association server 130 (or affiliated server), which will then store the IP address from which the request originates, the embedded organization identifier, and any other related information of interest.

The above examples of the various techniques with which the interaction identification module 131 might obtain interaction information tentatively associating addresses with organization are purely for purposes of example. The association server 130 could employ any number of such techniques, including ones different from those described above.

In one embodiment, regardless of the particular technique employed, the interaction identification module 131 obtains at least the following items of information for each potential relationship between a candidate address and an organization: (1) the IP address itself; (2) a timestamp corresponding to the time that the data were obtained; (3) an identifier of the technique that was used to obtain the data; and (4) location data corresponding to an estimated physical address. The location data of (4) may vary based on the technique of (3): for example, the location data returned by the welcome control described above might be a postal code, and the organization selection control might return a full mailing address.

In one embodiment, the interaction identification module 131 stores the obtained data on the possible address/organization relationships in the interaction database 132.

Thus, the association server 130 stores information on observed relationships between candidate addresses and organizational entities. There are situations, however, in which the candidate address in fact should not be associated with the organization. For example, an employee of an organization might read an e-mail sent to him at his work address from his home computer or mobile phone, which do not use IP addresses in the same range as those belonging to the organization. Similarly, the employee might access his e-mail from a public or remote location, and it would not be desirable to conclude definitively that such IP addresses are those of the organization.

The correlation engine 135 analyzes the data obtained by the interaction identification module 131 in the interaction database 132 to more accurately associate the addresses with related network addresses. In order to address the above-noted complication of IP addresses that should not actually be associated with an organization, the correlation engine 135 includes a scoring module 137 that computes a score quantifying the likelihood that a given candidate address tentatively associated with an organization does in fact belong to the organization.

The scoring module 137 can examine a variety of different factors in different embodiments when computing the score. In some embodiments, the score is based on a combination of a number of these different factors, rather than a single factor. To help illustrate these factors, assume the following fictional employee, holding a title at a fictitious office of a fictitious organization:

John Q. Smith
VP, Sales
NPE Suit Manufacturing Ltd.
100 Wiley Ave.
Marshall, Tex. 75670

In addition, assume that NPE, although a single organization, has multiple offices throughout the country—one in Marshall, one in San Francisco, and one in Atlanta. Each has its own block of IP addresses assigned by a local ISP.

In one embodiment, one scoring component considered by scoring module 137 is the geographic distance between the candidate address and known physical location of the organization. For example, if Mr. Smith reads an e-mail on his mobile phone, or from his laptop computer while on vacation in Florence, the IP address noted by association server 130 will be a Florentine IP address, and consequently will not correspond to known information about NPE Suits. Scoring module 137 therefore assigns a low score to the candidate address. Alternatively, if the IP address geolocates to eastern Texas, a known location of NPE that is an indication that the candidate IP address does indeed belong to the organization. In one embodiment, the greater the distance is between the location of the candidate address and a known location of the organization, the lower the assigned score. In one embodiment, if the candidate address geolocates to an alternate known location of the organization, an intermediate score is assigned. For example, Mr. Smith may have recently been transferred from the Marshall office to the San Francisco office. Thus, if Mr. Smith reads his e-mail in San Francisco, a known location of NPE Suits, an intermediate score is assigned. In one embodiment, the location of the organization is stored in the contact database 131 as part of the data on the organization, and the location corresponding to the candidate address is determined with reference to a publicly available database such as ARIN.

Another factor considered by scoring module 137 is the number of people from an organization or subgroup that use the candidate address. For example, if 200 responses are received from a particular IP address tentatively associated with the legal department of NPE Suits, then it is highly likely that the IP address belongs to the NPE legal department, and the scoring module 137 thus assigns a high score to the association of the IP address with the legal department. Conversely, if only one response is received from that candidate IP address, the IP address is assigned a substantially lower value for this component of its score. Note that as described below, the IP address may be unique among the responses, but may lie within a range of IP addresses from which the responses originate, and may therefore be scored highly for that reason.

In one embodiment, the more the timestamp of a candidate IP address falls within typical hours of operation for an organization, the higher the score for the association of the IP address and the organization or organization subgroup. For example, a response from a contact at a retailer received at 2:00 PM would lead to a higher score than would a score received at 3:00 AM. In one embodiment, the typical hours of operation of the organization are determined with reference to the time zone of the organization. The time zone of the organization may be listed in the organization database 134 directly, or it may be determined based on a location of the organization listed in the organization database. Similarly, responses received during the week on regular business days may receive higher scores than those received on the weekend or on a holiday.

In one embodiment, address independence is considered as a scoring component. The fewer the times a candidate address has already been associated with other organizations, the higher the score assigned by the scoring module 137 to the association of the address and the organization. For example, if a particular IP address has been associated with a number of different organizations—e.g., has been used to respond to e-mails sent to different organizations—then it is unlikely to belong to one of the organizations, and is more likely to belong to a public computer or other unaffiliated location. In one embodiment, the score for this factor is further determined based in part on the times of association of the address with the organizations. For example, if a given address were associated with three different organizations, but two of the associations were determined a year earlier, those two previous associations could be ignored as being beyond a six-month threshold. In one embodiment, the relationship of organizations is analyzed, e.g. with reference to information in the organization database 134, or to publicly available business data, to determine whether various distinct organizations associated with an address are in fact all part of one larger organization and thus may share the address.

In one embodiment, another component for scoring candidate addresses is consistency with existing network address information. If information on addresses associated with an organization is already known, it may be used in computing the score for the address/contact association. For example, a publicly-available database such as ARIN may already list a range of IP addresses associated with NPE Suits; if so, and if the candidate address does in fact fall within that known range, then the address is given a higher score.

Consistency with existing area code data is another scoring component in one embodiment. If the area code associated with the candidate address matches that of a known location of the organization or subgroup thereof, then the scoring module 137 assigns a higher score than if it does not. In one embodiment, the area code for the address is determined using the public address registry 141, and the area code for the organization is determined using the organization database 134.

Consistency with existing organization name data is still another scoring component in one embodiment. If the name of the organization in a public database such as the public address registry 141 matches that in the organization database 134, then the scoring module 137 assigns a higher score than if it does not. For example, assume the interaction database 132 contains a tentative mapping of an IP address with the organization "NPE Suit Manufacturing Ltd." based on opening of an email sent to jsmith@npesuits.com from that IP address, where the organization database 134 lists domain npesuits.com as belonging to "NPE Suit Manufacturing Ltd." If the public address registry 141 likewise lists domain npesuits.com as being owned by "NPE Suit Manufacturing Ltd." (or something textually similar, such as "NPE Suits"), then the score for the association between the organization NPE Suit Manufacturing Ltd. and the IP address from which the email was opened is higher than if the public address registry listed the domain as being owned by an ISP. In one embodiment, the match need not be exact; for example, the calculated score between "NPE Suits Ltd." and "NPE Suit Manufacturing Ltd." would still be large due to the strong, if not exact, similarity.

Based on the scores calculated by the scoring module 137, the correlation engine 135 identifies certain ones of the address/organizational entity relationships, as stored in the interaction database 132, to be sufficiently accurate. These identified relationships are stored within the network address database 138 for future use, with the remainder being discarded in one embodiment. In one embodiment, a score is calculated as a weighted sum of the various possible score components, where each component may be given a different weight, e.g., by a system designer based on the designer's evaluation of the importance of that component. In one embodiment, a score is considered to indicate that the address/organizational entity relationship with which it is associated is sufficiently accurate if the score is greater than some threshold value.

The correlation engine further comprises an adjustment module 136 that adjusts mechanisms of the scoring module 137 based on evaluations of prior candidate address/organizational entity relationships. In one embodiment, the parameters used by the various scoring components are altered. For example, it might be observed that the address/organizational entity relationships of the interaction database 132 were confirmed 80% of the time when the timestamp of association falls between 3 and 5 PM, and hence the adjustment module 136 would cause relationships with timestamps not between 3 and 5 PM to be discarded before being provided to the scoring module 137, or that the score component that is based on the time of day should be set to the lowest possible value (e.g., zero) by the scoring module. In one embodiment, the adjustment module 136 sets weightings of the various scoring components based on how reliable they have proven to be. For example, it might be observed that one of the scoring components tends to produce a high corresponding component value for address/organizational entity relationships for which the overall score is found to be below some minimum threshold, and in consequence the adjustment module 136 could reduce a weight associated with that scoring component so that it contributes less to the overall score.

The network address database 138 stores associations between network addresses (e.g., IP addresses) and organizational entities, based on the determinations of the correlation engine 135. For example, the network address database 138 can be queried to identify organizational entities associated with a specific IP address or range of IP addresses, or can be queried to identify one or more IP addresses associated with an organizational entity.

Figure 2:
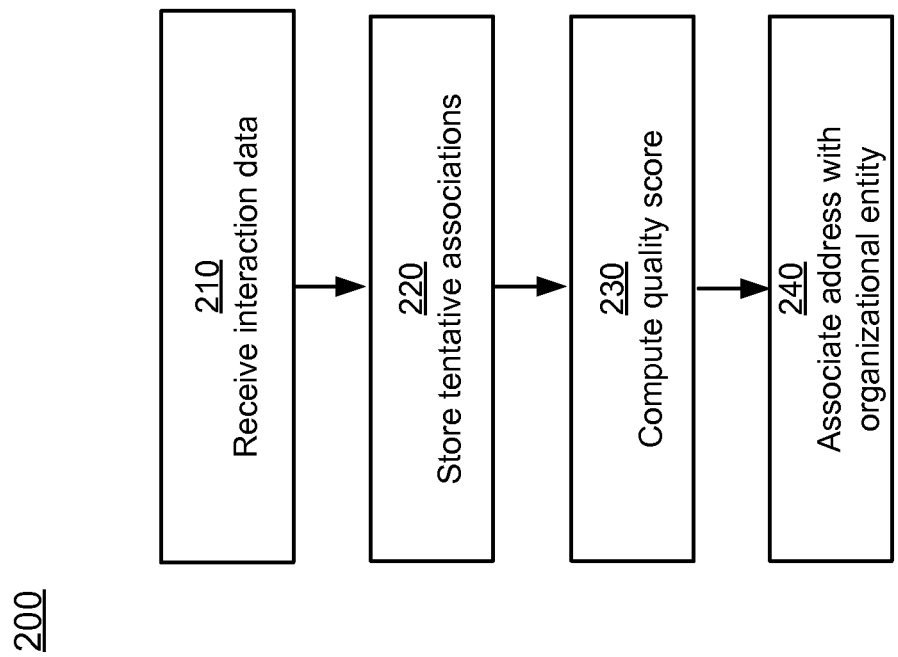
FIG. 2 is a flowchart depicting the steps that take place when associating an address with an organizational entity, according to one embodiment.

The visitor identification module 139 takes as input a network address, such as an IP address, and returns identifiers (e.g., textual names) of one or more of organizational entities associated with that network address in the network address database 138, or information associated with those names, such as corresponding organization data from the organization database 134. For example, given an IP address of a visitor to a web site, the visitor identification module 139 in one embodiment returns identifiers of an organizational entity with which the IP address is associated, such as the name "Legal Department, NPE Suit Mfg. Ltd." In one embodiment, the visitor identification module 139 is implemented as a server process accessible to a client via the network 110, such as a web service. FIG. 2 is a flowchart depicting the steps that take place when associating an address with an entity, according to one embodiment. In step 210, the interaction identification module 131 of the association server 130 receives interaction identification data, such as an explicit user selection of a particular organization name on a web page, that indicate a possible relationship between an organization and a network address. In one embodiment, the interaction data include, in addition to the network address, a timestamp of the interaction (e.g., the time that a user supplied the organization name), location data corresponding to an estimated geographic location, and an identifier of the technique that was used to obtain the data.

In step 220, the interaction identification module stores, in the interaction database 132, address/organizational entity relationships. The addresses are part of the data directly received by the interaction identification module 131. The organizations may be included explicitly within that data (e.g., when supplied directly by the user as a change to an organization name provided by a welcome control), or they may be inferred from other data (e.g., mapping a domain name of an email recipient that opened the message to an organization name using the organization database 134).

In step 230, the scoring module 137 of the association server 130 computes a quality score for each relationship of an address with an organization to determine whether or not the address does in fact belong to the organization. Computation of the various factors that influence the score proceeds as discussed above with regard to the scoring module 137. Each scoring component is evaluated and combined to determine a final score for the candidate address. In various embodiments, the components may be weighted, either at design time or at the discretion of the implementer. In various embodiments, the weights are determined manually or automatically, e.g., as described above with respect to the adjustment module 136. In one embodiment, survey questions are used to assess the importance of each scoring component to the database maintainer, and the responses to the survey are then used to adjust the weightings appropriately.

With the score determined, the correlation engine 135 determines whether or not to associate 240 the candidate network address with the organizational entity. In one embodiment, association is performed only if the score meets or exceeds a threshold. Association results in the candidate address being stored in the network address database 138 in association with an identifier of the organizational entity.

Using the information stored in the network address database 138, it is possible to provide meaningful identification of users of a given network address. For example, a company interested in knowing who is browsing its web pages in order to initiate a follow-up sales call could capture the source IP addresses of web page requests to its site, submit them to the visitor identification module 139 of the association server 130, and in response receive identifiers of organizational entities associated with the IP address. The response could further contain additional information from the organization database 134, such as organization e-mail addresses to use to facilitate making contact.

It is appreciated that the techniques discussed above could equally be used to identify individuals, as well as organizations. For example, rather than embedding a reference including an identifier of an individual contact in the probe message, an identifier of the contact's organization could be embedded and associated with the network addresses of the resulting request.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of associating an organizational entity with a network address, the method comprising:
    sending an e-mail to a user, the e-mail having a destination address with a domain name corresponding to the organizational entity and including a reference to external content;
    receiving interaction data describing an interaction with the user over a network, the user associated with the organizational entity, the interaction data comprising a request for the external content and a network address associated with the user during the request;
    retrieving a record associated with the organizational entity from a database;
    determining, based at least in part on the interaction data, a score indicating a likelihood that the network address is associated with the organizational entity; and
    responsive to the score exceeding a threshold, storing the network address in the record associated with the organizational entity.

2. The computer-implemented method of claim 1, wherein the interaction data comprise an identifier of one of a plurality of possible techniques that was used to obtain the interaction data.

3. The computer-implemented method of claim 1, wherein the reference to external content comprises a graphical object to be rendered in association with display of the e-mail to the user, the graphical object including a beacon pixel.

4. The computer-implemented method of claim 1, wherein determining the score comprises determining a geographic distance between a physical location associated with the network address and a physical location associated with the organizational entity.

5. The computer-implemented method of claim 1, wherein determining the score comprises determining a number of people associated with both the organizational entity and the network address.

6. The computer-implemented method of claim 1, wherein determining the score comprises determining a time of day at which the request was received.

7. The computer-implemented method of claim 1, wherein determining the score comprises determining a day on which the request was received.

8. The computer-implemented method of claim 1, wherein determining the score comprises determining a number of organizational entities with which the network address has been associated.

9. The computer-implemented method of claim 1, wherein determining the score comprises comparing a value of an attribute associated with the network address in a publicly-available database with a value of the attribute associated with the organizational entity in a contact database, the attribute being one of a telephone area code, an organization name, and an area code.

10. The computer-implemented method of claim 1, further comprising:
    receiving a network address associated with a request for a web page; and
    transmitting an identifier of an organization associated with the received network address.

11. The computer-implemented method of claim 1, wherein the organizational entity is a subgroup of an organization.

12. The computer-implemented method of claim 1, wherein determining the score is based at least in part on a time at which the interaction occurred.

13. A computer-implemented method for associating an organizational entity with a network address, the method comprising:
    receiving interaction data describing an interaction with a user over a network, the user associated with an organizational entity, the interaction data comprising a network address associated with the user during the interaction;
    retrieving a record associated with the organizational entity from a database;
    comparing a value of an attribute associated with the network address in a publicly-available database with a value of the attribute associated with the organizational entity in a contact database, the attribute being one of a telephone area code, an organization name, and an area code
    determining, based at least in part on a result of the comparing, a score indicating a likelihood that the network address is associated with the organizational entity; and
    responsive to the score exceeding a threshold, storing the network address in the record associated with the organizational entity.

14. The computer-implemented method of claim 13, wherein the interaction data comprise a name of the organizational entity specified by a user on a web page, and wherein the network address is an IP address associated with the user when the name of the organizational entity was specified on the web page.

15. The computer-implemented method of claim 13, wherein the interaction data comprise a record of an interaction with an email, wherein the network address is an IP address from which the email was received.

16. The computer-implemented method of claim 13, wherein determining the score comprises determining a geographic distance between a physical location associated with the network address and a physical location associated with the organizational entity.

17. The computer-implemented method of claim 13, wherein determining the score comprises determining a number of people associated with both the organizational entity and the network address.

18. A computer-implemented method for associating an organizational entity with a network address, the method comprising:
   receiving interaction data describing an interaction with a user over a network, the user associated with an organizational entity, the interaction data including a network address associated with the user during the interaction;
   retrieving a record associated with the organizational entity from a database;
   determining a geographic distance between a physical location associated with the network address and a physical location associated with the organizational entity;
   determining, based at least in part on the determined geographic distance, a score indicating a likelihood that the network address is associated with the organizational entity; and
   responsive to the score exceeding a threshold, storing the network address in the record associated with the organizational entity.

19. The computer-implemented method of claim 18, wherein determining the score comprises determining a number of organizational entities with which the network address has been associated.

20. The computer-implemented method of claim 18, wherein the interaction data comprise a name of the organizational entity specified by a user on a web page, and wherein the network address is an IP address associated with the user when the name of the organizational entity was specified on the web page.

* * * * *